United States Patent
Ambrose-Thurman et al.

(10) Patent No.: US 10,139,498 B2
(45) Date of Patent: Nov. 27, 2018

(54) RADIATION MEASUREMENT APPARATUS AND METHOD

(71) Applicant: JOHNSON MATTHEY PUBLIC LIMITED COMPANY, London (GB)

(72) Inventors: Andrew Michael Luke Ambrose-Thurman, Durham (GB); Kevan Bradley Dales, Cleveland (GB); Emanuele Ronchi, Cleveland (GB); Christopher Thomas Hudson, Tyne and Wear (GB)

(73) Assignee: Johnson Matthey Public Limited Company, London, England (GB)

( * ) Notice: Subject to any disclaimer, the term of this patent is extended or adjusted under 35 U.S.C. 154(b) by 12 days.

(21) Appl. No.: 15/038,489

(22) PCT Filed: Dec. 18, 2014

(86) PCT No.: PCT/GB2014/053762
§ 371 (c)(1),
(2) Date: May 23, 2016

(87) PCT Pub. No.: WO2015/097447
PCT Pub. Date: Jul. 2, 2015

(65) Prior Publication Data
US 2016/0299236 A1    Oct. 13, 2016

(30) Foreign Application Priority Data
Dec. 23, 2013  (GB) .................................. 1322939.8

(51) Int. Cl.
*G01T 1/00*  (2006.01)
*G01T 1/20*  (2006.01)
(Continued)

(52) U.S. Cl.
CPC ............ *G01T 1/2018* (2013.01); *G01T 1/175* (2013.01); *G01T 1/362* (2013.01); *G01T 1/40* (2013.01); *G01V 5/005* (2013.01); *G01V 5/0016* (2013.01)

(58) Field of Classification Search
CPC ....... G01T 1/204; G01T 1/2045; G01T 1/202; G01T 1/178; G01T 1/2985
See application file for complete search history.

(56) References Cited

U.S. PATENT DOCUMENTS

| | | | |
|---|---|---|---|
| 2,659,011 | A | 11/1953 | Youmans et al. |
| 3,056,885 | A | 10/1962 | Scherbatskoy |

(Continued)

FOREIGN PATENT DOCUMENTS

| | | |
|---|---|---|
| EP | 1 265 079 A2 | 11/2002 |
| EP | 1515163 | 3/2005 |

(Continued)

OTHER PUBLICATIONS

International Search Report PCT/GB2014/053762 dated Jul. 21, 2015.

(Continued)

*Primary Examiner* — David Porta
*Assistant Examiner* — Mamadou Faye
(74) *Attorney, Agent, or Firm* — Baker & Hostetler LLP

(57) ABSTRACT

An apparatus for measuring radiation includes a plurality of detectors (2), each detector (2) including: a scintillating material (4) for emitting light in response to incident radiation (6), and a photodetector (8) for receiving light emitted by the scintillating material (4) and outputting an electrical pulse in response to light received from the scintillating material (4), wherein a parameter characterising the electrical pulse is related to an energy associated with the incident radiation (6); and a power supply (10) for supplying power (Continued)

to a plurality of the photodetectors (8). The apparatus reduces the volume of hardware to be transported to the measurement location and therefore provides particular advantages for scanning pipelines and other structures located deep underwater.

15 Claims, 2 Drawing Sheets

(51) Int. Cl.
    *G01T 1/175* (2006.01)
    *G01T 1/40* (2006.01)
    *G01V 5/00* (2006.01)
    *G01T 1/36* (2006.01)

(56) References Cited

U.S. PATENT DOCUMENTS

| | | | |
|---|---|---|---|
| 4,403,145 A | 9/1983 | Stevens et al. | |
| 5,008,539 A * | 4/1991 | Kirby | G01N 23/00 250/336.1 |
| 7,323,691 B1 | 1/2008 | Caruba et al. | |
| 8,895,931 B2 * | 11/2014 | Howe | G01D 11/26 250/358.1 |
| 2002/0153492 A1 | 10/2002 | Sekine et al. | |
| 2009/0114826 A1 * | 5/2009 | Takahashi | G01T 1/2018 250/363.03 |
| 2011/0019800 A1 | 1/2011 | Spahn | |
| 2011/0101230 A1 | 5/2011 | Inbar | |
| 2011/0157935 A1 * | 6/2011 | Bancroft | H02M 3/3388 363/75 |
| 2012/0312995 A1 | 12/2012 | Morf et al. | |
| 2012/0318988 A1 * | 12/2012 | Taghibakhsh | G01T 1/2985 250/362 |
| 2015/0241572 A1 * | 8/2015 | Bowdon | G01N 23/046 378/64 |

FOREIGN PATENT DOCUMENTS

| | | |
|---|---|---|
| WO | 2011037945 A2 | 3/2011 |
| WO | 2013064838 | 5/2013 |

OTHER PUBLICATIONS

Hamamatsu: "Chapter 5. How to use Photomultiplier Tubes and Peripheral Circuits", Internet Citation, Jan. 1, 2006, pp. 83-112, XP007908696.

Great Britain Search Report issued in Application No. GB1322939. 8, dated May 6, 2014.

Great Britain Search Report and Examination Report issued in Application No. GB1422653.4, dated Mar. 17, 2015.

\* cited by examiner

RADIATION MEASUREMENT APPARATUS AND METHOD

BACKGROUND OF THE INVENTION

Field of the Invention

The present invention relates to an apparatus and method for measuring radiation, and relates particularly, but not exclusively, to an apparatus and method for scanning a structure to detect changes in density between different parts of the structure. The apparatus and method of the invention have particular benefits for use in an undersea pipeline inspection apparatus.

Description of the Related Art

It is known to use gamma radiation for scanning structures, for example to obtain information about the density within the structure or to identify flaws such as cracks or corrosion in a structure. This is particularly useful for inspecting pipes subsea, where it is not always possible to inspect the pipe from the interior. Gamma scanning is also used for obtaining information about other industrial structures such as distillation columns and the like.

An apparatus for scanning structures such as a pipeline or process vessel using gamma radiation is described in GB 2496736 A. This apparatus comprises a source of gamma radiation and an array of detectors. The apparatus is capable of being arranged with the structure to be scanned, such as a pipeline, positioned between the source and detectors so that radiation emitted by the source can pass along a plurality of paths through a portion of the structure to the detectors. The number of detectors in the array may range from fewer than 10 up to more than 100, e.g. up to 150, depending on the application. To obtain high resolution data, a large number of detectors are used, closely spaced from one another. The detectors are arranged in the form of an arc centred on the structure to be scanned. In operation, the source and array of detectors are arranged in fixed relationship with respect to each other, and are rotated around the structure to be scanned. In this way, information about the density of the structure along a plurality of paths is obtained, enabling a high resolution density map of the structure to be calculated. This technique has similarities with medical imaging techniques such as x-ray tomography.

When deploying this gamma scanning techniques in a subsea environment, there are additional challenges which do not arise with land-based measurements. When operating subsea at a depth of 1000 metres the pressure is 100 atmospheres. For each additional 1000 metres of depth below sea level, the pressure increases by a further 100 atmospheres. The apparatus must be able to withstand this pressure. Furthermore the apparatus must be compact for deployment subsea using submarines capable of operating at the required depth. It is challenging to package all the required components of the apparatus into a sufficiently small volume. In order to deploy this technique at even greater depths, it is necessary to meet ever more stringent requirements, particularly regarding the size of the apparatus.

A typical detector for detecting gamma radiation comprises a scintillating crystal and a photodetector. Gamma rays entering the scintillation crystal interact with the scintillating material to produce photons in the visible and/or ultra violet region. These scintillation photons are detected using a photodetector, typically a photomultiplier tube (PMT), which outputs an electrical pulse. The electrical pulse provides information about the number and energy of the incident gamma photons. Counting the number of electrical pulses corresponding to gamma rays transmitted from the source to the detector, through the structure being scanned, enables differences in the density of different parts of the structure to be detected.

Integrating a large number of photodetectors into an apparatus for use subsea is one of the many challenges of designing such an apparatus. Photomultiplier tubes are preferred due to their high sensitivity to low light levels. However, photomultiplier tubes comprise vacuum tubes which must be sealed against the high pressure encountered at depth. Photomultiplier tubes also require high voltages (~1 kV) for biasing the dynodes of the photomultiplier tube and these high voltages must be effectively isolated for subsea operation. The power supply for each photomultiplier tube must also be very stable because the gain or calibration of photomultiplier tubes is very sensitive to changes in the high voltage biasing voltage.

BRIEF SUMMARY OF THE INVENTION

Preferred embodiments of the present invention seek to overcome one or more of the above disadvantages of the prior art.

According to the present invention there is provided an apparatus for measuring radiation, comprising:
 a plurality of detectors, each detector comprising:
  a scintillating material for emitting light in response to incident radiation, and
  a photodetector for receiving light emitted by the scintillating material and outputting an electrical pulse in response to light received from the scintillating material,
  wherein a parameter characterising the electrical pulse is related to an energy associated with the incident radiation; and
 a power supply for supplying power to a plurality of said photodetectors.

By providing a power supply for supplying power to a plurality of the photodetectors, the overall volume of the apparatus is reduced. This reduction in volume of the apparatus is critical to deploying the apparatus at greater depth subsea. Reducing the number of power supplies also reduces the electrical isolation requirements.

The apparatus may comprise a plurality of power supplies, wherein each power supply is arranged to supply power to a respective plurality of photodetectors.

By providing a plurality of power supplies, it is possible to power a greater number of photodetectors than that allowed by the maximum power output of a single power supply.

The apparatus may further comprise at least one capacitor for stabilising the voltage supplied by the power supply.

Advantageously this prevents an event at one photodetector from affecting the biasing voltage applied to another photodetector, thereby maintaining a stable power supply to each photodetector. In one embodiment, the capacitor is connected between the terminals of the power supply.

The apparatus may further comprise at least one data acquisition part for receiving electrical pulses output by a respective detector and counting a number of said electrical pulses having a value for said parameter for a predetermined range. The data acquisition part may be configured: to count a respective number of electrical pulses having a value for said parameter within each one of a plurality of sampling ranges; to identify a value of interest for said parameter based on the counted numbers of electrical pulses in said sampling ranges; to determine a measurement range centred on said value of interest; and to count a number of electrical pulses having a value for said parameter within said measurement range.

This feature enables the number of electrical pulses corresponding to particles (e.g. photons) of radiation detected by each one of the detectors to be counted, taking into account the fact that each photodetector may have a different gain, since it is no longer possible to individually tune the gain of each photodetector by adjusting the power supply when two or more photodetectors are powered by each power supply. Additionally by counting a number of electrical pulses having a value for said parameter within said measurement range, a single number is retained for the measurement along each path, rather than a complete spectrum, which reduces the data storage and transmission requirements of the apparatus.

Said data acquisition part is configured to count said respective numbers of electrical pulses successively.

Although scanning through a plurality of sampling ranges takes more time counting electrical pulses in all sampling ranges simultaneously, as would be the case if using a multichannel analyser, the advantage is that less hardware is required, thereby saving space.

Preferably, said value of interest of said parameter corresponds to the full energy of the incident radiation.

That is, the measurement range is centred on or covers the photopeak produced by deposit of the full energy of the particles (e.g. photons) of radiation in the scintillating material.

In a preferred embodiment, said radiation is gamma radiation.

In a preferred embodiment the photodetector is a photomultiplier tube.

The apparatus may further comprise a source of radiation.

The apparatus may be a subsea apparatus. For example, the apparatus may be a subsea apparatus suitable for use at a depth of 1000 m. The apparatus may be a subsea apparatus suitable for use at a depth greater than 1000 m.

The plurality of detectors may be arranged in an arc around a space adapted to receive a structure to be scanned.

The plurality of detectors and said source may be arranged on opposite sides of said space, and the apparatus may further comprise means for rotating said plurality of detectors and said source around a structure to be scanned, in fixed spatial relation to each other.

According to a second aspect of the invention, there is provided a method for measuring radiation, using an apparatus as defined above, comprising:

counting a respective number of electrical pulses having a value for said parameter within each one of a plurality of sampling ranges;

identifying a value of interest for said parameter based on the counted numbers of electrical pulses in said sampling ranges;

determining a measurement range centred on said value of interest; and counting a number of electrical pulses having a value for said parameter within said measurement range.

Said respective numbers of electrical pulses may be counted successively.

The method may further comprise the step of positioning the apparatus at a subsea measurement location, prior to carrying out above steps at said location. For example, the subsea measurement location may be at a depth of up to 1000 m. The subsea measurement location may be at a depth of 1000 m or greater.

BRIEF DESCRIPTION OF THE DRAWINGS

A preferred embodiment of the present invention will now be described, by way of example only and not in any limitative sense, with reference to the accompanying drawings, in which.

DETAILED DESCRIPTION OF THE PREFERRED EMBODIMENTS

Figure 1:
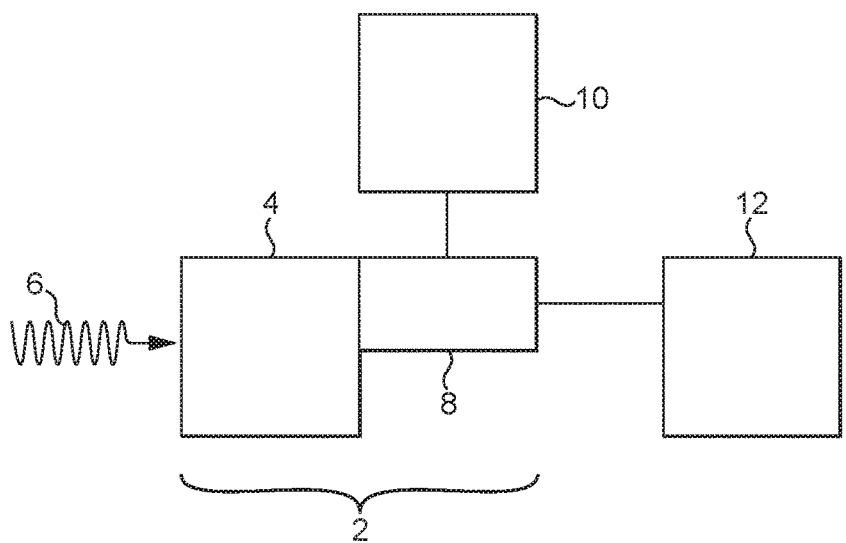
FIGS. 1 and 2 are schematic representations of an apparatus for measuring radiation according to a preferred embodiment of the present invention.
Figure 2:
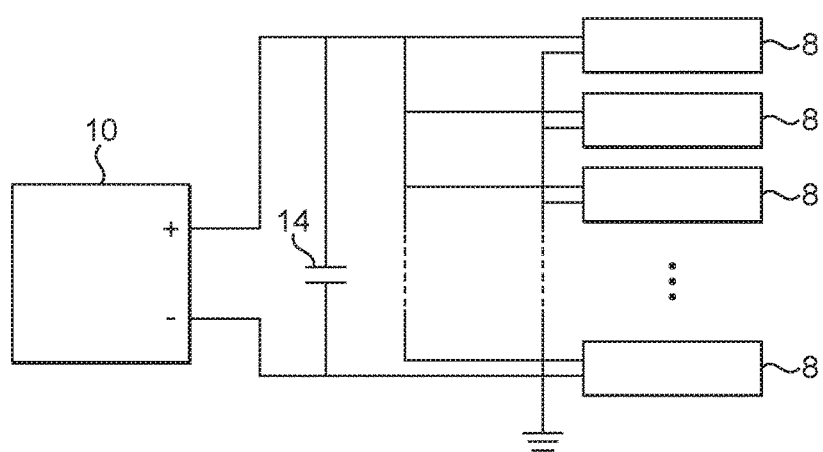

An apparatus for measuring radiation according to an embodiment of the present invention is illustrated by FIGS. 1 and 2. The apparatus comprises a plurality of detectors, although only one is shown in FIG. 1. With reference to FIG. 1, each detector 2 comprises a scintillating material 4, in the form of a scintillating crystal 4, for emitting light in response to incident radiation 6, and a photodetector 8, in the form of a photomultiplier tube 8, for receiving light emitted by the scintillating material 4 and outputting an electrical pulse in response to light received from the scintillating material 4. The electrical pulse output by the photodetector 8 is related to an energy associated with the incident radiation 6. The electrical pulse output by the photodetector 8 is received by a respective data acquisition part 12, comprising a pulse height analyser, for counting the number of photons of gamma radiation detected by the detector 2. The photodetector 8 is powered by a power supply 10. In this embodiment the power supply 10 is a high voltage power supply, as required for powering the photomultiplier tube 8.

The radiation source is a gamma radiation source, such as $^{137}$Cs which has a characteristic emission at 661.7 keV and sufficient penetrating power for scanning dense structures such as subsea pipelines. A scintillating material suitable for detecting gamma photons at this energy is BGO (bismuth germanate). However, other sources and scintillating materials may be used as is known in the art.

With reference to FIG. 2, a single power supply 10 supplies power to a plurality of photomultiplier tubes 8 connected in parallel. A capacitor 14 is connected across the terminals of the power supply 10 for stabilising the voltage to the photodetectors 8. The negative terminal of the power supply 10 is connected to ground. A 220 µF high voltage capacitor 14 has been found to be sufficient for stabilising the voltage when up to seven photomultiplier tubes 8 are connected in parallel to a single power supply 10. This is a surprising result, since conventionally each photomultiplier 8 would be powered by a dedicated power supply. This has previously been considered necessary for maintaining voltage stability for biasing the photomultiplier tube in order to avoid fluctuations in gain.

For simplicity, only one power supply 10 is shown in FIG. 2. However, for scanning a pipeline or similar structure, a large number of detectors 2 is preferable for obtaining high resolution data with a reasonable scanning time. In one embodiment of the apparatus, 95 detectors 2 are arranged closely spaced along an arc of a circle on one side of the structure to be scanned, with the radiation source positioned on the other. The apparatus includes means for positioning the source and detectors 2 in close proximity to the structure and for rotating the source and detectors 2 around the structure, without changing their relative positions. To power such a large number of photodetectors 8, several power supplies 10 may be used, each one supplying power to a plurality of photodetectors 8.

The number of photodetectors 8 which can be connected to a single power supply 10 is limited by the maximum power which can be drawn from the power supply 10. Photomultiplier tubes generally have a low input resistance for optimal operation. However, it has been found that increasing the input resistance of the photomultiplier tubes 8 has the advantage of reducing their power draw, thereby enabling more photomultiplier tubes to be connected to the same power supply, and that any deterioration in performance is small enough to be outweighed by this advantage.

It has been found that up to at least seven photomultiplier tubes can be powered by a single power supply without any significant deterioration in performance. This reduction in hardware represents an important saving, particularly in reducing the space occupied by the power supplies when a large number of detectors are used. For example, in an apparatus comprising 95 photodetectors 8, the number of power supplies required is reduced from 95, as would be used according to the prior art, to just 14 when the photodetectors 8 are grouped in groups of six or seven, each group powered by a single power supply 10.

The detector 2 is sensitive not only to the number of gamma photons detected, but also their energies. The amplitude of the electrical pulses output by the photomultiplier tube 8 depends on the energy of the photons received from the scintillating material 4. Since the amount of light produced by the scintillating material 4 is proportional to the amount of gamma ray energy absorbed in the scintillating material 4, it follows that the amplitude of the electrical pulses output by the photomultiplier tube 8 depends on the gamma ray energy absorbed by the scintillating material 4. The data acquisition part 12, comprising a pulse height analyser, includes circuitry for discriminating between pulses of different amplitude and for counting the number of electrical pulses having an amplitude within a specified range.

FIG. 3 shows an example energy spectrum 20 for scintillation events detected by one of the photomultiplier tubes 8. This high resolution spectrum was obtained using a multi-channel analyser (MCA), and is shown by way of example only. In the present embodiment, data is acquired using a pulse height analyser operating in scanning mode at a lower resolution, as will be described below. In FIG. 3, the vertical axis shows the number of events detected (i.e. the number of electrical pulses output by the photomultiplier tube 8), and the horizontal axis shows the channel number of the multi-channel analyser (MCA) to which the pulses were assigned. Each channel corresponds to an amplitude range of the detected electrical pulses.

Figure 3A:
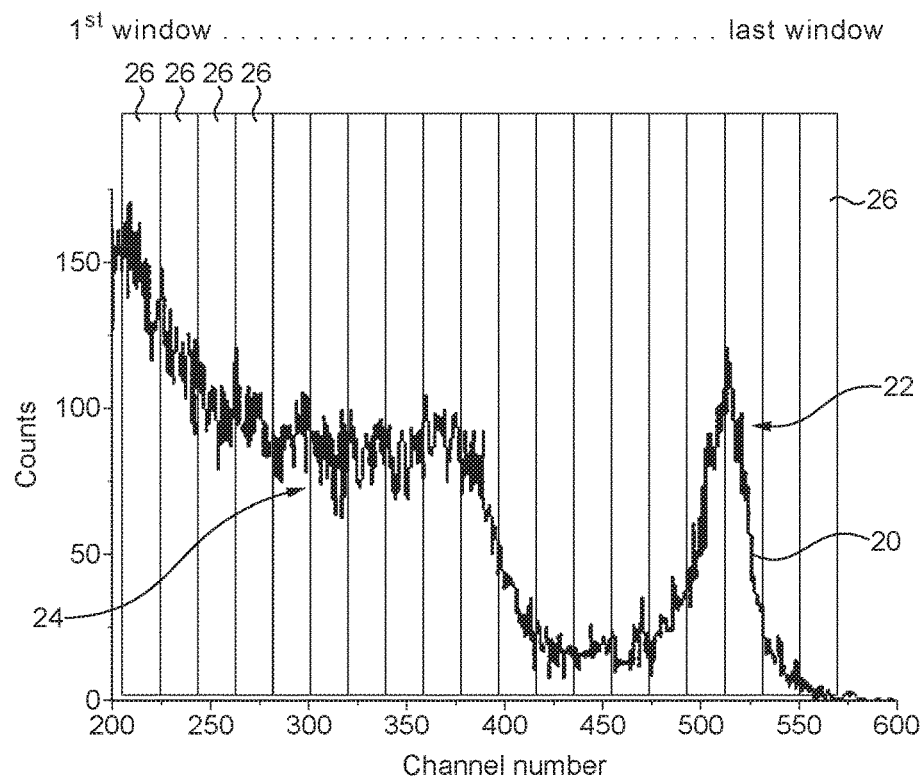
FIGS. 3a and 3b illustrate a scanning and sampling procedure used in a preferred embodiment of the present invention.

The gamma ray source used for obtaining the spectrum 20 shown in FIG. 3 is $^{137}Cs$, which has a characteristic emission at 661.7 keV. However the energy spectrum 20 shown in FIG. 3A is not a single narrow peak because of the way the gamma photons interact with the scintillating material 4. The conversion to visible photons made by the scintillating material 4 depends on whether the gamma photons are completely absorbed or randomly scattered by the scintillating material 4. The peak 22 towards the right of the spectrum 20 (around channel number 510) is called the photopeak and is due to interaction processes in the scintillating material 4 in which the full energy of a gamma photon is deposited in the scintillating material 4, for example the photoelectric effect. The photopeak 22 appears as a Gaussian due to intrinsic energy broadening within the detector 2 itself. The mean and standard deviation of the Gaussian photopeak 22 give information concerning the energy of the gamma photons and the detector resolution respectively. The signal 24 to the left of the photopeak 22 is due to processes which deposit only a part of the energy of a gamma photon in the scintillating material 4, such as Compton scattering, which lead to a smooth distribution at energies lower than the photopeak 22. Background radiation also contributes to the spectrum 20 at low energies.

The only useful information comes from the photopeak 22. Changes in the height of the photopeak 22 give information about changes in the density of the structure through which the radiation has travelled. When measuring gamma radiation, one would typically focus on this part of the spectrum, performing what is commonly called 'windowing'.

The position of the photopeak 22 with respect to channel number depends on the gamma photon energy and photodetector gain. In the case of a photomultiplier tube, the gain depends on temperature, photomultiplier tube biasing voltage and the intrinsic properties of the particular photomultiplier tube used. A problem with using photomultiplier tubes is that the manufacturing process cannot guarantee a consistent gain for all tubes. This means that given the same boundary conditions (voltage, temperature etc.) different photomultiplier tubes would provide signals for the photopeak centered on different channels (i.e. electrical signals corresponding to the full gamma photon energy are output with a different amplitude by each photomultiplier tube). In the prior art, this effect would be compensated by tuning the respective high voltage power supply of each photomultiplier tube, but this is only possible in cases in which the photomultiplier tubes are independently powered. In the present invention, this is not possible because groups of photodetectors 8 are each powered by a single power supply 10.

This problem is partly avoided by grouping photomultiplier tubes 8 having similar intrinsic gain together. That is, photomultiplier tubes 8 belonging to a group powered by a single power supply 10 are selected from all those available by identifying those having a similar gain under identical conditions (temperature, voltage). The voltage output of the power supply 10 is then adjusted to broadly optimise the average gain of all the photomultiplier tubes 8 in the group for the specific application. However, this does not completely remove the problem as each photomultiplier tube 8 will still generate pulses corresponding to the photopeak 22 at different channel numbers.

Figure 3B:
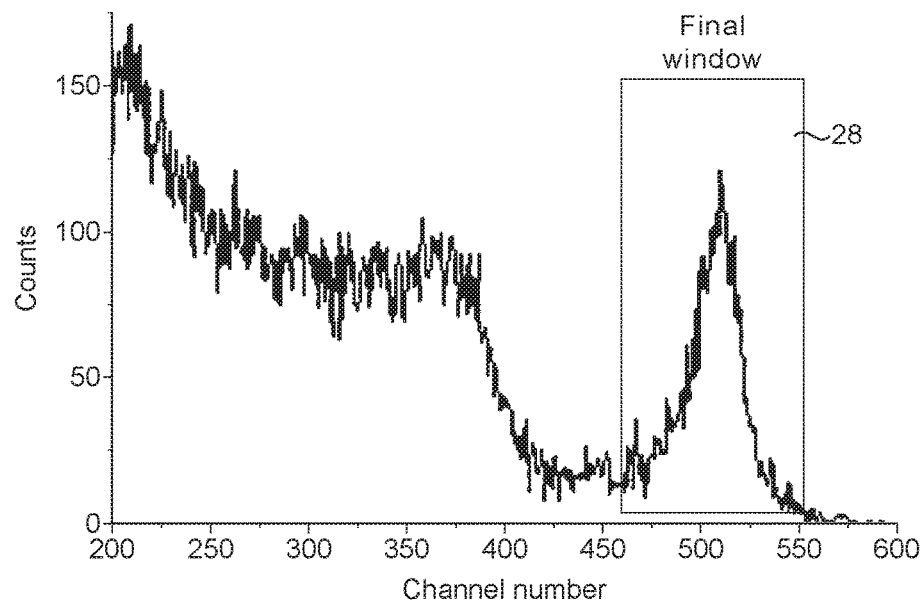

In the present embodiment, this problem is solved by using a software tool capable of adapting a measurement range 28 to the photopeak 22 for each photodetector 8. This technique is illustrated by FIG. 3. Instead of collecting the detailed spectrum 20 shown in FIG. 3, a pulse height analyser is used in scanning mode to count a number of electrical pulses having an amplitude within a specified sampling range or window 26 (FIG. 3A). The sampling window 26 is scanned (stepped) along the spectrum to count the number of electrical pulses in each successive sampling range 26. The collection time interval for each sampling range 26 is maintained constant while moving the window the necessary steps to move throughout the whole spectrum (move-count-move etc.). From the number of counts recorded for each sampling range 26, it is possible to locate the photopeak 22 and to define its mean position and width. A final measurement range or window 28 is then defined (FIG. 3B). The measurement range 28 is preferably centered on the mean of the photopeak 22 and is wide enough to cover the whole photopeak 22, typically between two and three times the standard deviation of the photopeak 22. This sequence is repeated for each of the photodetectors 8 in the apparatus, i.e. 95 times in the present embodiment. The entire sequence may be repeated each time a measurement is made, or whenever measurement conditions (e.g. position or temperature) change.

This technique, involving scanning through the spectrum using a sampling window 26 is slow but effective for identifying the position of the photopeak 22 for each photomultiplier tube 8. Importantly, it compensates for the inability to individually tune the power supply 10 for each photomultiplier tube 8, such that it is possible to use one power supply 10 to power two or more photodetectors 8. By using a single channel pulse height analyser and scanning through the spectrum, considerable space is saved compared to using a multi-channel analyser which requires much more circuitry. It has been found that around 64 sampling windows 26 are sufficient for identifying the position of the photopeak 22 with suitable precision. Rather than storing the entire spectrum 20, a single count output from the measurement range 28 is output.

Although the present embodiment is based on gamma photon detection using photomultiplier tubes, it will be appreciated that the present invention may be applied to other types of radiation (e.g. neutrons) and other types of photodetectors (e.g. avalanche photodiodes) in situations where conventionally each photodetector would be powered by an individual power supply. In the present invention, a number of photodetectors are powered by a single power supply. It has been found that the problem of maintaining a stable photodetector gain can be overcome by using a stabilising capacitor, by grouping photodetectors having similar intrinsic gain properties, by adjusting the power draw of the photodetectors, and/or by using the detection process described above to identify detection events corresponding to the photopeak.

It will be appreciated by persons skilled in the art that the above embodiments have been described by way of example only, and not in any limitative sense, and that various alterations and modifications are possible without departure from the scope of the invention as defined by the appended claims.

The invention claimed is:

1. A subsea apparatus for measuring radiation, comprising:
   a plurality of detectors, each detector comprising:
      a scintillating material configured to emit light in response to incident radiation, and
      a photodetector configured to receive light emitted by the scintillating material and output an electrical pulse in response to light received from the scintillating material, a parameter characterizing the electrical pulse being related to an energy associated with the incident radiation; and
   a power supply configured to supply power to a plurality of said photodetectors connected in parallel to the at least one power supply.

2. The subsea apparatus according to claim 1, further comprising a plurality of power supplies, each power supply being configured to supply power to a respective plurality of photodetectors.

3. The subsea apparatus according to claim 1, further comprising at least one capacitor configured to stabilize the voltage supplied by a respective power supply.

4. The subsea apparatus according to claim 1, further comprising at least one data acquisition part configured to receive electrical pulses output by a respective detector and count a number of said electrical pulses having a value for said parameter within a predetermined range,
   wherein said data acquisition part is configured to:
      count a respective number of electrical pulses having a value for said parameter within each one of a plurality of sampling ranges,
      identify a value of interest for said parameter based on the counted numbers of electrical pulses in said sampling ranges,
      determine a measurement range centered on said value of interest, and
      count a number of electrical pulses having a value for said parameter within said measurement range.

5. The subsea apparatus according to claim 4, wherein said data acquisition part is configured to count said respective numbers of electrical pulses successively.

6. The subsea apparatus according to claim 4, wherein said value of interest of said parameter corresponds to the full energy of the incident radiation.

7. The subsea apparatus according to claim 1, wherein said radiation is gamma radiation.

8. The subsea apparatus according to claim 1, wherein said photodetector is a photomultiplier tube.

9. The subsea apparatus according to claim 1, further comprising a source of radiation.

10. The subsea apparatus according to claim 1, wherein said plurality of detectors is disposed in an arc around a space capable of receiving a structure to be scanned.

11. The subsea apparatus according to claim 10, further comprising:
   a source of radiation, said plurality of detectors and said source of radiation being disposed on opposite sides of said space; and
   a rotation system configured to rotate said plurality of detectors and said source of radiation around a structure to be scanned, in fixed spatial relation to each other.

12. A method for measuring radiation, using the subsea apparatus according to claim 1, comprising the steps of:
   positioning the subsea apparatus at a subsea measurement location;
   counting a respective number of electrical pulses having a value for said parameter within each one of a plurality of sampling ranges;
   identifying a value of interest for said parameter based on the counted numbers of electrical pulses in said sampling ranges;
   determining a measurement range centered on said value of interest; and
   counting a number of electrical pulses having a value for said parameter within said measurement range.

13. The method according to claim 12, wherein said respective numbers of electrical pulses are counted successively.

14. The method according to claim 12, wherein the subsea measurement location is at a depth of 1000 m or greater.

15. The subsea apparatus according to claim 5, wherein said value of interest of said parameter corresponds to the full energy of the incident radiation.

* * * * *